Figure 1:
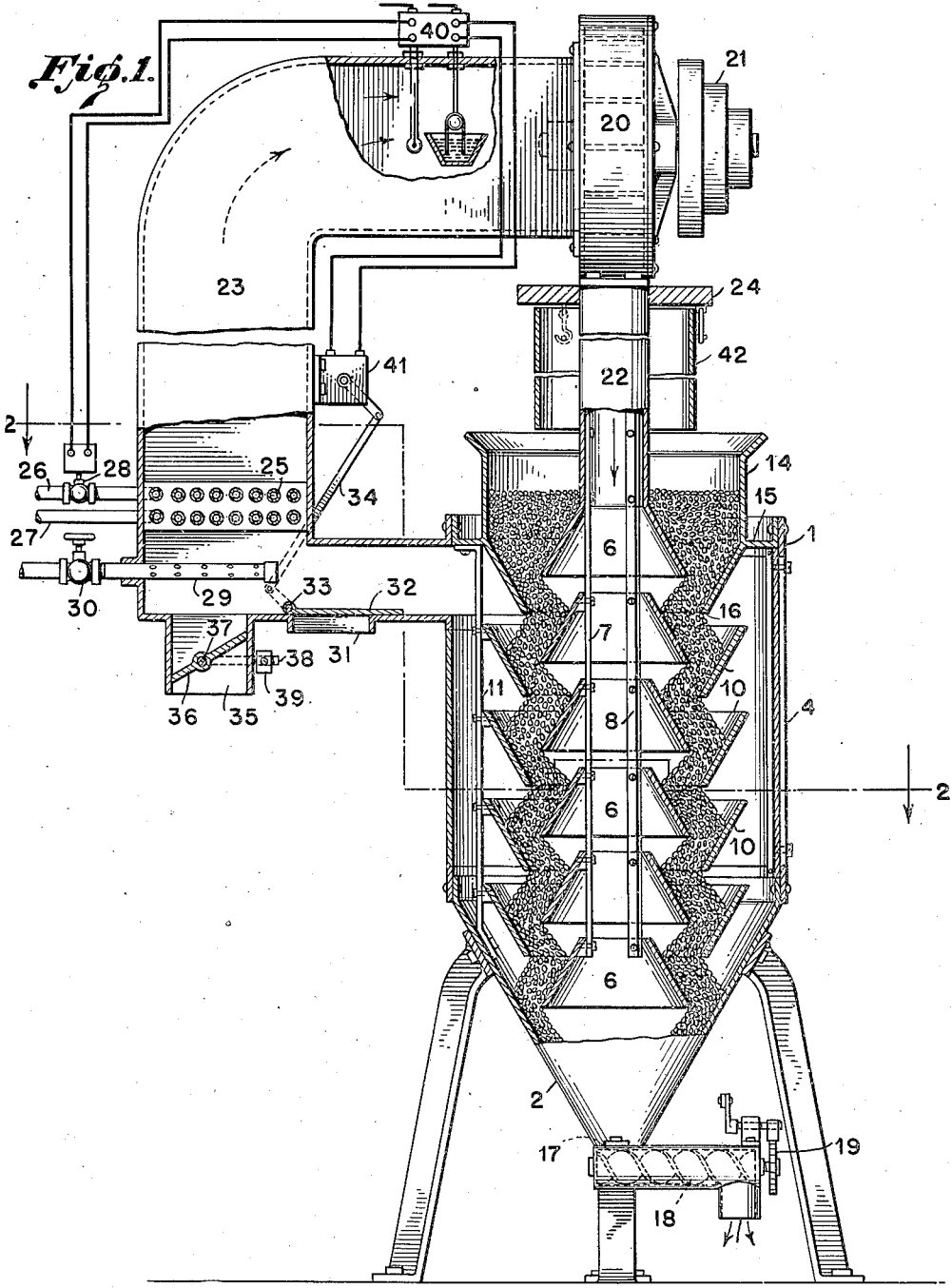

Oct. 24, 1944.   J. O. REED   2,361,151
COOKER AND DEHYDRATOR
Filed Nov. 25, 1942   2 Sheets-Sheet 2

INVENTOR
Jesse O. Reed
BY
ATTORNEYS

Patented Oct. 24, 1944

2,361,151

UNITED STATES PATENT OFFICE 2,361,151

COOKER AND DEHYDRATOR

Jesse O. Reed, Washington, D. C., assignor to Claude R. Wickard, as Secretary of Agriculture of the United States of America, and his successors in office Application November 25, 1942, Serial No. 466,956

4 Claims. (Cl. 99—246)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

This invention relates to a new and useful materials-processing apparatus, and in particular to an apparatus for cooking or dehydrating materials such as food products.

Various types of processing apparatuses, such as dehydrators, have objectionable features. In the usual type, generally known as the batch or tray type, the material to be processed is placed on trays, is subjected to the action of a stream of processing gas, and is not moved from its original position until processing of the batch is completed. This type requires frequent attendance, is slow because it involves the changing of batches, and is wasteful of heat due to losses when batches are changed.

In another type generally known as the drum type, material to be processed is continuously fed into, and the processed material is continuously removed from, a large metal drum in which the material is agitated while being subjected to a stream of processing gas. Because of the agitation, much of the dehydrated material breaks up into powder and loss of material arises due to the light powder being blown from the drum by the air stream. Also, in the handling of many food products, the use of the very large drum is not satisfactory because it is difficult to keep it clean.

This invention eliminates to a large measure the disadvantages enumerated above, and has among its objects: the provision of a processing apparatus which continuously moves the material being processed through an enclosed casing without agitating it; the provision of a processing apparatus which is easy to keep clean; the provision of a processing apparatus of simple construction and of small size, yet one which is efficient and of large production capacity; the provision of a processing apparatus which can be used for other processing, such as cooking, as well as for dehydrating; the provision of a processing apparatus which retains most of the original food elements in the material being processed; the provision of a processing apparatus in which the degree of dehydration or cooking is simply controlled by the rate at which the dehydrated or cooked material is removed; the provision of a processing apparatus in which the material is fed through it by gravity; and further objects which will be apparent from the following description and claims.

Figure 2:
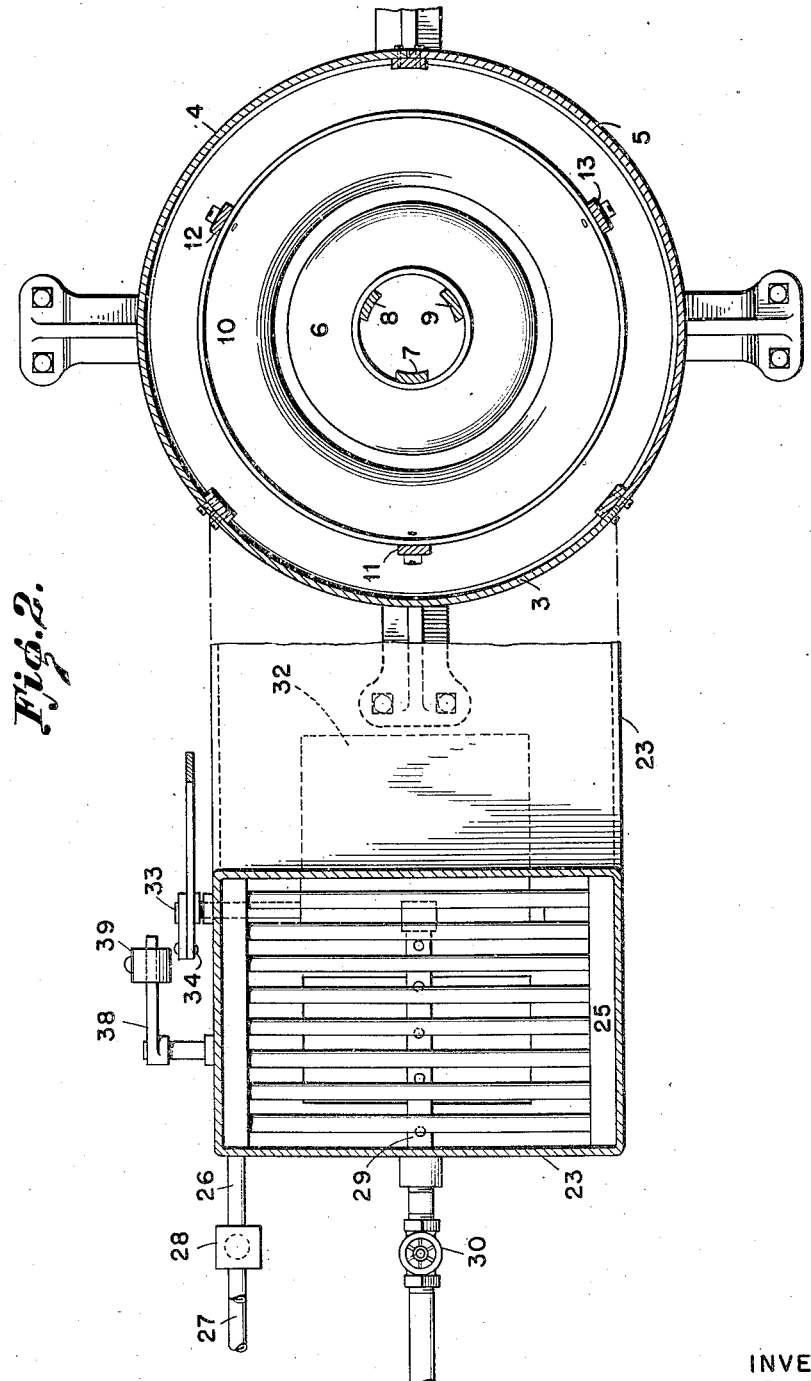

In the accompanying drawings,

Figure 1 is a longitudinal section of the processing apparatus, some parts being shown in elevation; and Figure 2 is a section on the line 2—2 of Figure 1.

Referring to the drawings in detail, an upright cylindrical casing 1 is provided at its bottom end with a conical shaped discharge chute 2. The side walls of the casing are provided with panels 3, 4, and 5 that can be readily opened to allow access to the interior of the casing for inspection and cleaning. An upright cage having generally tubular inner and outer walls providing a continuous space between them is located inside the casing and opens into the discharge chute.

The inner wall of the cage is formed by a series of upwardly spaced-apart frustums 6, which are supported by supporting members 7, 8, and 9 located inside the wall and suspended from above. The frustums are positioned with their larger ends facing downwardly. The outer wall is formed by a series of upwardly spaced-apart larger frustums 10, surrounding the inner wall and supported by supporting members 11, 12, and 13, located outside the wall and supported at their lower ends. The larger frustums are positioned with their larger ends facing upwardly. The individual frustums form smooth-surface slantingly disposed members, those of one wall arranged alternately with those of the other. The angularity of the members and their relative positions are such that granular material, such as fruits, chipped meats, and so forth, may be fed into the top of the cage between the walls and will slide down each surface by gravity and will pass from each member onto the next lower member of the opposite wall but will not spill over the top of the members. The construction provides a continuous unobstructed passage between the walls through which the material passes, but because the weight of the material is largely sustained by the frustums, the tendency to pack the material at the bottom of the cage is minimized.

A hopper 14 is positioned at the top of the casing and sealed thereto by a flange 15. The hopper opens to the outside and has a discharge opening 16 feeding into the top of the cage. A material to be processed is placed in the hopper, slowly feeds through the cage as it is being processed, and discharges into the discharge chute 2, which is provided at its bottom with a discharge opening 17 emptying into a suitable means, such as a screw conveyor 18 provided with a variable speed operating device 19, for removal of the processed material. Due to the construction and arrangement of the parts, the rate of removal of the processed material controls the rate of feeding.

Means for circulating a processing gas through the casing and material being processed is provided by a blower 20 which may be driven by a variable speed pulley 21, and is connected to communicate with the tubular inner wall of the cage by a duct 22 leading through the hopper and to communicate with an opening in the casing by a duct 23. The processing gas is thus circulated through the openings in the walls of the cage formed by the spaces between the individual frustums and is forced through the material. Due to the fact that the openings in their lateral dimensions are the same as the corresponding dimensions of the cage, and are of uniform height, and that the feeding rate of the materials and passage of the processing gas are uniform, the materials are subjected to uniform treatment. The blower is suitably supported on a platform 24 which may be conveniently positioned above the casing.

Means for heating the processing gas is provided by a heater 25 which may be located in the duct 23, and is preferably a steam coil connected to a source of steam through pipes 26 and 27, one of which is provided with a heat-regulating valve 28 which is preferably automatically controlled.

Means for adding live steam to the processing gas for blanching, for cooking, for adding steam for dehydrating if the gas is too dry, for cleaning the apparatus, and so forth, is provided by a perforated pipe 29 located inside the circulating system and connected to a steam supply source through a valve 30.

Regulation of the humidity of the processing gas is provided by an exhaust port 31 preferably located in a wall of the duct 23 and regulated by an exhaust damper 32 mounted on a pivot rod 33. The pivot rod is connected to a control arm 34 located on the outside of the duct. The damper in one extreme position closes the port 31, thus directing all the gas back through the system while in its other extreme position it opens the port and closes the duct, thus directing all the gas to the outside. In intermediate positions the gas is divided between return to the system and direction to the outside. Gas directed to the outside is replaced by outside dry gas admitted through an inlet port 35 located in the wall of duct 23 between the exhaust port and the blower. The opening of port 35 may be regulated by a valve 36 mounted on a rod 37 connected to a control arm 38 on the outside of the duct. Valve 36 is readily automatically regulated by having it mounted on rod 37 in an off-center position such that it is automatically opened by the excess outside gas pressure when the pressure in the duct drops and by having a weight 39 attached to control arm 38, tending to hold the valve closed.

Both the temperature and humidity of the processing gas are preferably automatically controlled by dry bulb and wet bulb thermometers operating suitable electric or pneumatic control devices in a box 40 for operating valve 28 and damper control motor 41, respectively. Automatic control equipment suitable for purposes of this kind is well known, and further description is unnecessary.

The humidity is simply controlled by directing the moist gas to the outside through exhaust port 31 and admitting dryer gas through inlet port 35 when the gas in the circulating system becomes too moist. Inlet port 35 is shown communicating with the outside atmosphere, but if gases other than atmospheric air, such as predried air, flue gas, and so forth, are required, they may be admitted through the inlet port.

The variable adjustment means for controlling the wet bulb and dry bulb temperatures have such ranges of temperature control that the apparatus is usable either as a cooker or as a dehydrator. Suitable cooking temperatures for some materials are, for example, 240° F. dry bulb and 180° F. wet bulb, while for dehydrating, of some products at least, a temperature of 160° F., dry bulb, and 110° F., wet bulb, is quite satisfactory. Of course, either cooking or dehydrating may be effected at temperatures considerably varied from those indicated above, depending upon the nature of the material being processed and on the results desired.

For cooking, ports 31 and 35 are preferably closed, and steam, if needed, is admitted through perforated pipe 29 to obtain the desired amount of moisture in the processing gas.

In some instances it may be necessary to close some of the spaces between the frustums, for example, in starting or stopping a run. A tubular imperforate member 42 is provided for this purpose. The member 42 may be formed from a pair of semi-cylindrical parts, whereby it can be positioned around the duct 22 in the proper location to be slid down between the inner and outer walls of the cage, thus closing any desired number of spaces between the frustums at the top of the cage.

All parts within the casing have vertical or inclined surfaces and liquids which form on the parts will drain off them and out of the discharge opening at the bottom of the chute. This results in an apparatus which can be easily cleaned. All that is necessary is to circulate live steam through the system and to drain the discharge from the discharge opening until all parts are clean and sterile. Of course, the panels 3, 4, and 5 may be opened for cleaning the parts, but this is not ordinarily necessary. The interior of and parts within the casing may be enameled for sanitary reasons.

A particular advantage arises in the use of the apparatus in that grease and other liquids, which are liberated from the material being processed, drain down the inclined flat surfaces toward the inside of the cage and move through the cage to be discharged with the processed material, thus retaining many of the original food elements and most of the flavor. This is especially advantageous when the apparatus is used as a cooker.

Having thus described my invention, I claim:

1. A materials-processing apparatus comprising a cage having a wall formed by a series of slantingly disposed, upwardly spaced-apart, smooth-surface members and a second wall laterally spaced from the first wall and formed by a second series of upwardly spaced-apart smooth-surface members, oppositely slantingly disposed and alternately positioned relative to the members of the first series, whereby a granular material when fed into the cage at the top will slide down the surfaces of the members by gravity but will not spill over the top of the members, means for passing a processing gas through the spaces between the members and through a material in the cage, and means for closing some of the spaces between the members.

2. The apparatus of claim 1, characterized in that the last-mentioned means comprises an imperforate member slidingly positioned between the two walls.

3. A materials-processing apparatus comprising a cage having an inner wall formed by a series of upwardly spaced-apart, smooth-surface frustums with their larger ends facing downwardly, and an outer wall formed by a second series of upwardly spaced-apart, smooth-surface, larger frustums surrounding the inner wall and alternately positioned with reference to the frustums of the first series with their larger ends facing upwardly, whereby granular material when fed into the cage at the top will slide down the surfaces of the frustums by gravity but will not spill over the tops of the frustums, means for passing a processing gas through the spaces between the frustums and through a material in the cage, and means for closing some of the spaces between the frustums.

4. The apparatus of claim 1, characterized in that the last-mentioned means comprises an imperforate member slidingly positioned between the two walls.

JESSE O. REED.